United States Patent
Liu et al.

(10) Patent No.: US 8,582,646 B2
(45) Date of Patent: Nov. 12, 2013

(54) METHODS FOR DELTA-QP SIGNALING FOR DECODER PARALLELIZATION IN HEVC

(75) Inventors: Wei Liu, San Jose, CA (US); Lina Dong, San Jose, CA (US)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 13/038,090

(22) Filed: Mar. 1, 2011

(65) Prior Publication Data

US 2012/0183049 A1    Jul. 19, 2012

Related U.S. Application Data

(60) Provisional application No. 61/433,039, filed on Jan. 14, 2011.

(51) Int. Cl.
*H04N 7/12* (2006.01)

(52) U.S. Cl.
USPC .................................. 375/240.03; 375/240.16

(58) Field of Classification Search
USPC ............. 375/240, 240.03, E07.139, E07.127, 375/E07.125, E07.193, E07.243, E07.135
See application file for complete search history.

(56) References Cited

U.S. PATENT DOCUMENTS

2012/0114034 A1* 5/2012 Huang et al. ............. 375/240.03

OTHER PUBLICATIONS

"Using the iPhone and iPod Touch for Remote Sensor Control and Data Acquisition", by Geltz, B. R. Electr. & Comput. Eng., Virginia Commonwealth Univ., Richmond, VA, USA and Berlier, J.A.; McCollum, J.M., pp. 9-12., Date of Conference Mar. 18-21, 2010.*

"Pipelined Block-Serial Decoder Architecture for Structured LDPC Codes", by Tejas Bhatt, Vishwas Stolpman and Dennis McCain, Nokia Research Center, Irving, TX, USA, I-4244-0469-X/06, pp. IV-225 to IV-228.*

Tan et al., "JCTVC-C405: Summary of HEVC working draft 1 and HEVC test model (HM)", 3rd JCTVC Meeting: Guangzhou,CN, Oct. 7-15, 2010, pp. 1-10.

Kazushi Sato, "Proposal on Large Block Structure and Quantization", Joint Collaborative Team on Video Coding (JCT-VC) of ITU-T SG16 WP3 and ISO/IEC JTC1/IEC JTC1/SC29/WG11, 3rd Meeting: Guangzhou, CN, Oct. 7-15, 2010, Document: JCTVC-C167, pp. 1-8.

* cited by examiner

*Primary Examiner* — David Czekaj
*Assistant Examiner* — Dramos I Kalapodas
(74) *Attorney, Agent, or Firm* — Haverstock & Owens LLP (57) ABSTRACT

By implementing a new bitstream for a Delta-Quantization Parameter (DQP), a decoder is able to implement parallel decoding of multiple coding units within a largest coding unit. In some embodiments, the DQP is placed immediately after the mode information of the first coding unit. In some embodiments, the DQP is placed after the mode information of the first non-skipped coding unit. In some embodiments, the DQP is placed after the first non-zero coded block flag.

24 Claims, 4 Drawing Sheets

METHODS FOR DELTA-QP SIGNALING FOR DECODER PARALLELIZATION IN HEVC

CROSS-REFERENCE TO RELATED APPLICATION(S)

This application claims priority under 35 U.S.C. §119(e) of the U.S. Provisional Patent Application Ser. No. 61/433,039, filed Jan. 14, 2011 and titled, "CHANGING BITSTREAM SYNTAX FOR DELTA-QP SIGNALING FOR DECODER PARALLELIZATION IN HEVC." The Provisional Patent Application, Ser. No. 61/433,039, filed Jan. 14, 2011 and titled, "CHANGING BITSTREAM SYNTAX FOR DELTA-QP SIGNALING FOR DECODER PARALLELIZATION IN HEVC" is also hereby incorporated by reference in its entirety for all purposes.

FIELD OF THE INVENTION

The present invention relates to the field of image processing. More specifically, the present invention relates to methods for delta-qp signaling for decoder parallelization in High Efficiency Video Coding (HEVC).

BACKGROUND OF THE INVENTION

In Advanced Video Coding (AVC), changing a quantization parameter (referred to as Delta Quantization Parameter (DQP)) is allowed at the macroblock level for better rate control and region-of-interest coding purposes. In the HEVC test Model (HM) 1.0, DQP is allowed at the Largest Coding Unit (LCU) level. The standard DQP syntax introduces difficulty in hardware decoding.

In the standard DQP syntax in HM:

Case I: If one LCU is not split into smaller coding units (CUs), and is coded in the SKIP mode, no DQP is signaled for that LCU.

Figure 1:
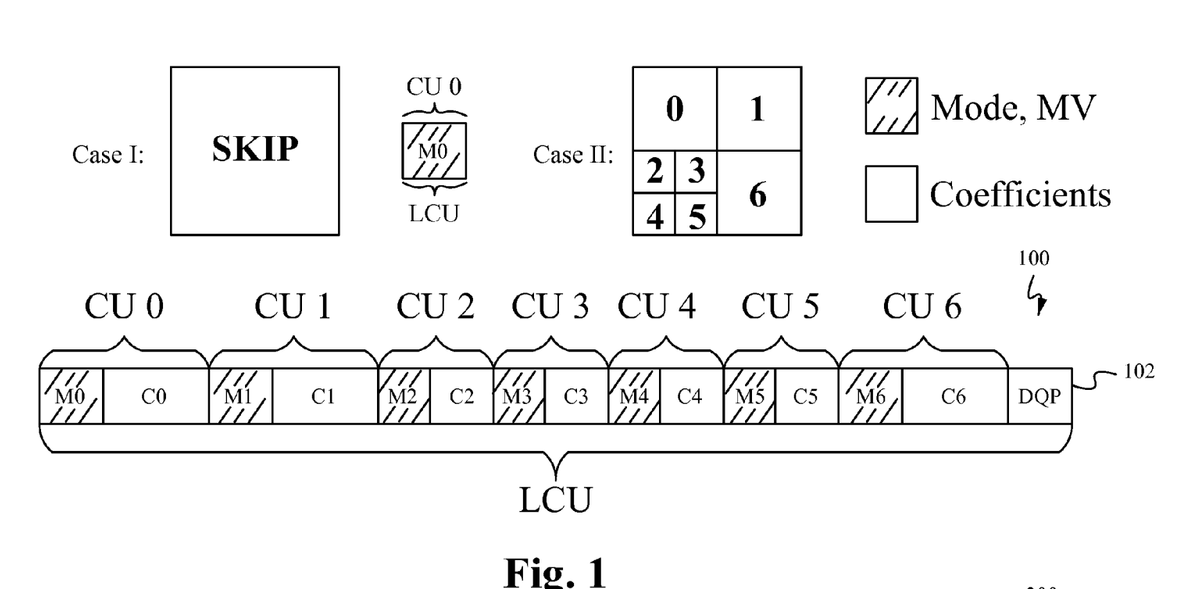
FIG. 1 illustrates an exemplary LCU syntax with the DQP at the end.

Case II: otherwise, the DQP is signaled at the end of the LCU.
  FIG. 1 shows an exemplary LCU 100 with the DQP 102 at the end.

HEVC allows an LCU to be split into smaller CUs through quad-tree partitioning, and encodes each CU within an LCU in z-order and interleaves their mode and coefficients. An example is shown in FIG. 1, where M0, M1, . . . , M6 represent the mode information for CU0, CU1, . . . , CU6, and C0, C1, . . . , C6 represent the DCT coefficients of CU0, CU1, . . . , CU6. The standard DQP syntax has significant disadvantages. On one hand placing DQP at the end of an LCU could introduce delay in decoding, which means, when C0 is entropy-decoded, reconstruction of CU0 is not possible until the DQP value is read. This will significantly increase the length of a decoding pipeline. On the other hand, the DQP is unnecessarily sent with the standard syntax. For example, if the LCU is partitioned into multiple SKIP CUs, or if the coded block flag (cbf) is zero for every Transform Unit (TU) inside the LCU, then there are no non-zero coefficients in the current LCU so DQP is not needed. But the standard syntax still signals DQP, which is a waste of bits.

SUMMARY OF THE INVENTION

By implementing a modified bitstream syntax for a Delta-Quantization Parameter (DQP), a decoder is able to implement parallel processing of multiple CUs within an LCU. In some embodiments, the DQP is placed immediately after the mode information of the first coding unit. In some embodiments, the DQP is placed after the mode information of the first non-skipped coding unit. In some embodiments, the DQP is placed after the first non-zero coded block flag.

In one aspect, a method programmed in a memory of a device comprises determining if a largest coding unit is coded in SKIP mode, if the largest coding unit is coded in the SKIP mode, then no delta quantization parameter is sent and if the largest coding unit is not coded in the SKIP mode, then signaling the delta quantization parameter immediately after mode information of a first coding unit. The method further comprises decoding the largest coding unit using the delta quantization parameter. The decoding implements pipelining. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, a method programmed in a memory of a device comprises determining if all coding units within a largest coding unit are coded in SKIP mode, if all of the coding units within the largest coding unit are coded in the SKIP mode, then no delta quantization parameter is sent and otherwise, signaling the delta quantization parameter immediately after mode information of a first non-skipped coding unit within the largest coding unit. The method further comprises decoding the largest coding unit using the delta quantization parameter. The decoding implements pipelining. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, a method programmed in a memory of a device comprises determining if any transform unit within the largest coding unit has a non-zero coded block flag, if all of the transform units have zero coded block flags, then no delta quantization parameter is sent and otherwise, signaling the delta quantization parameter immediately after a first non-zero coded block flag. The method further comprises decoding the largest coding unit using the delta quantization parameter. The decoding implements pipelining. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus for integrating a delta quantization parameter into a bitstream of a largest coding unit comprises a largest coding unit-skipped module for determining whether an entire largest coding unit is coded in a SKIP mode and a determination module for determining whether to place a delta quantization parameter in the largest coding unit based on the largest coding unit-skipped module. The determination module does not place the delta quantization parameter in the largest coding unit when the largest coding unit is coded in SKIP mode; otherwise, the determination module places the delta quantization parameter in the largest coding unit immediately after a first mode information. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus for integrating a delta quantization parameter into a bitstream of a largest coding unit comprises a coding unit-skipped module for determining whether all coding units within a largest coding unit are skipped and a determination module for determining whether to place a delta quantization parameter in the largest coding unit based on the coding unit-skipped module. The determination module does not place the delta quantization parameter in the largest coding unit when all of the coding units within the largest coding unit are skipped; otherwise, the determination module places the delta quantization parameter in the largest coding unit immediately after the mode information of a first non-skipped coding unit. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In yet another aspect, an apparatus for integrating a delta quantization parameter into a bitstream of a largest coding unit comprises a coded block flag module for determining whether all coded block flags within a largest coding unit are zeros and a determination module for determining whether to place a delta quantization parameter in the largest coding unit based on the coded block flag module. The determination module does not place the delta quantization parameter in the largest coding unit when all of the coded block flags within the largest coding unit are zeros; otherwise, the determination module places the delta quantization parameter in the largest coding unit immediately after a first non-zero coded block flag. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus comprises a memory for storing an application, the application for determining if a largest coding unit is coded in SKIP mode, if the largest coding unit is coded in the SKIP mode, then no delta quantization parameter is sent and if the largest coding unit is not coded in the SKIP mode, then signaling the delta quantization parameter immediately after the mode information of a first coding unit within the largest coding unit and a processing component coupled to the memory, the processing component configured for processing the application. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus comprises a memory for storing an application, the application for determining if all coding units within a largest coding unit are coded in SKIP mode, if all of the coding units within the largest coding unit are coded in the SKIP mode, then no delta quantization parameter is sent and otherwise, signaling the delta quantization parameter immediately after mode information of a first non-skipped coding unit within the largest coding unit and a processing component coupled to the memory, the processing component configured for processing the application. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In yet another aspect, an apparatus comprises a memory for storing an application, the application for determining if any transform unit within the largest coding unit has a non-zero coded block flag, if all of the transform units have zero coded block flags, then no delta quantization parameter is sent and otherwise, signaling the delta quantization parameter immediately after a first non-zero coded block flag and a processing component coupled to the memory, the processing component configured for processing the application. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

DETAILED DESCRIPTION OF THE PREFERRED EMBODIMENT

To improve the Delta Quantization Parameter (DQP) syntax, several possibilities exist. Specifically, the location of the DQP signaling is placed in different locations in the Largest Coding Unit (LCU) bitstream. By moving the DQP signaling, the decoder pipelining issue is resolved.

Figure 2:
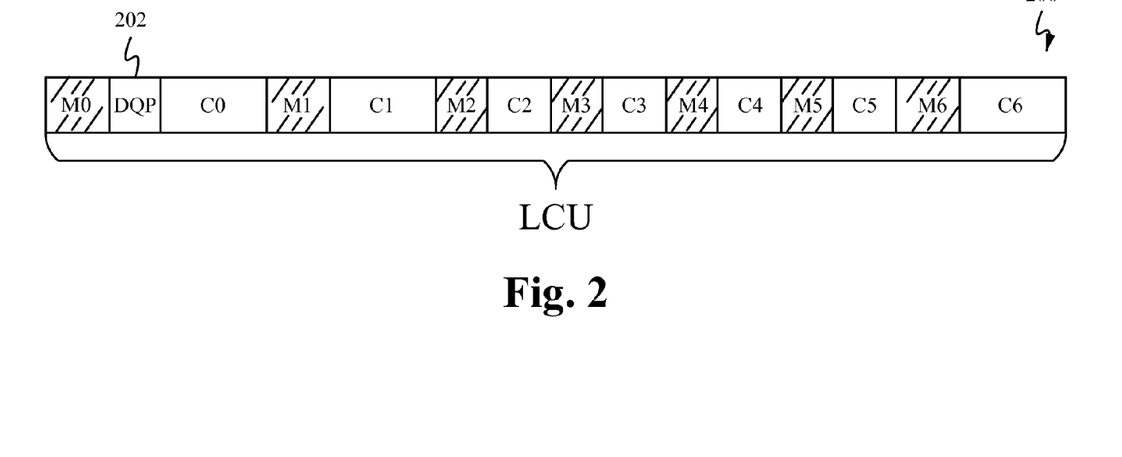
FIG. 2 illustrates a diagram of a modified LCU syntax according to some embodiments.

FIG. 2 illustrates a diagram of a modified LCU syntax according to some embodiments. When the LCU is coded in the SKIP mode, then no DQP is sent. However, in the modified LCU syntax 200, the DQP 202 is positioned immediately after the mode information ($M_0$) of the first CU if the LCU is not coded in the SKIP mode. With this change, decoder pipelining is enabled (e.g. after entropy decoding of CU0, CU0 is able to be reconstructed immediately, while the entropy decoder is able to simultaneously proceed to decode CU1).

Figure 3:
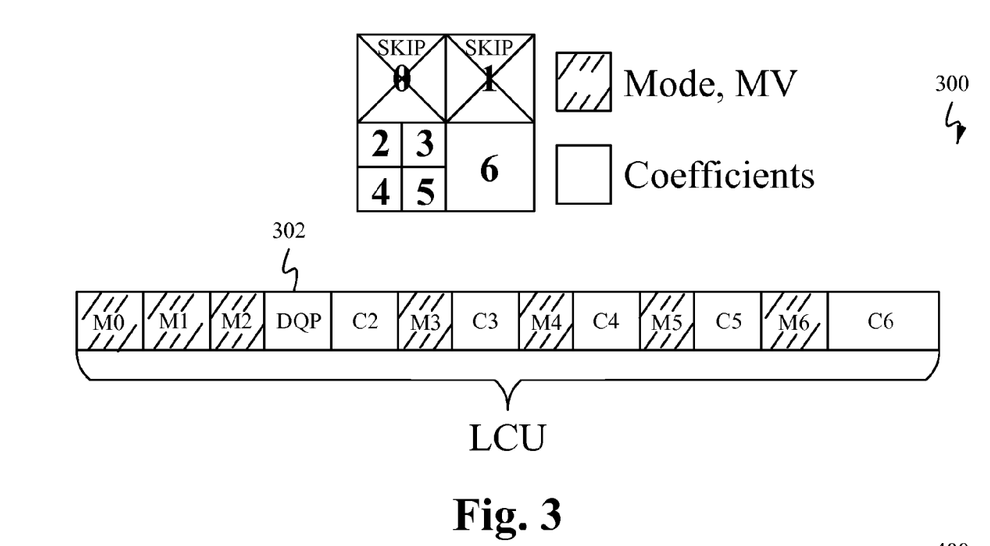
FIG. 3 illustrates a diagram of a modified LCU syntax according to some embodiments.

FIG. 3 illustrates a diagram of a modified LCU syntax according to some embodiments. When all of the Coding Units (CUs) within the LCU are coded in the SKIP mode, there is no DQP sent. Otherwise, in the modified LCU syntax 300, the DQP 302 is placed after the mode information of the first non-skipped CU. In FIG. 3, CU0 and CU1 are coded in the SKIP mode and CU2 is not skipped.

Figure 4:
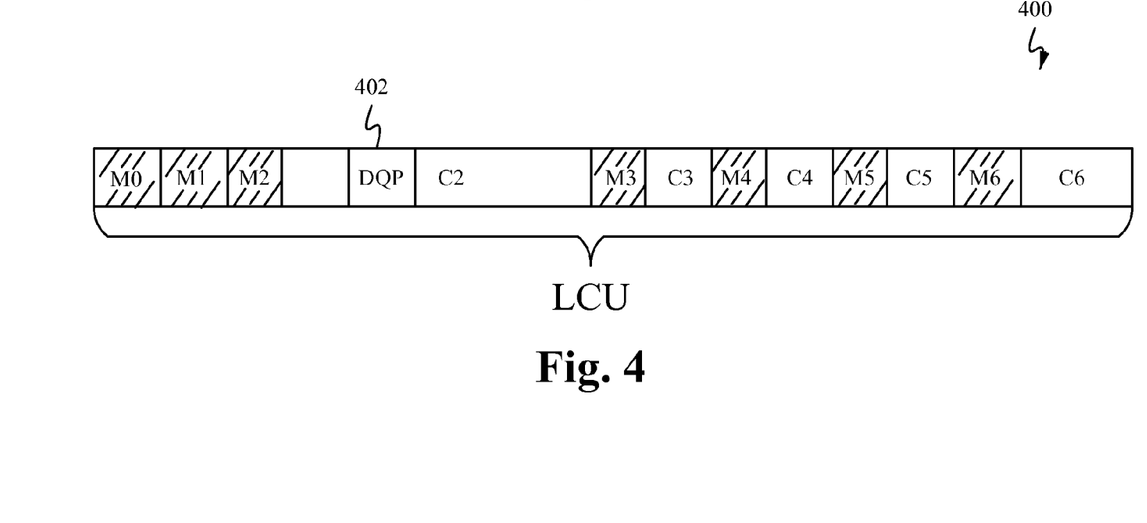
FIG. 4 illustrates a diagram of a modified LCU syntax according to some embodiments.

FIG. 4 illustrates a diagram of a modified LCU syntax according to some embodiments. When a Transform Unit (TU) has a coded block flag (cbf) equal to zero, there is no dequantization needed for that TU. Therefore, the DQP signaling is needed when the decoder first encounters a TU with a non-zero cbf. The DQP signaling 402 is placed after the first non-zero cbf, in the modified LCU syntax 400. When all TUs within an LCU have cbf equal to zero, DQP is saved.

Figure 5:
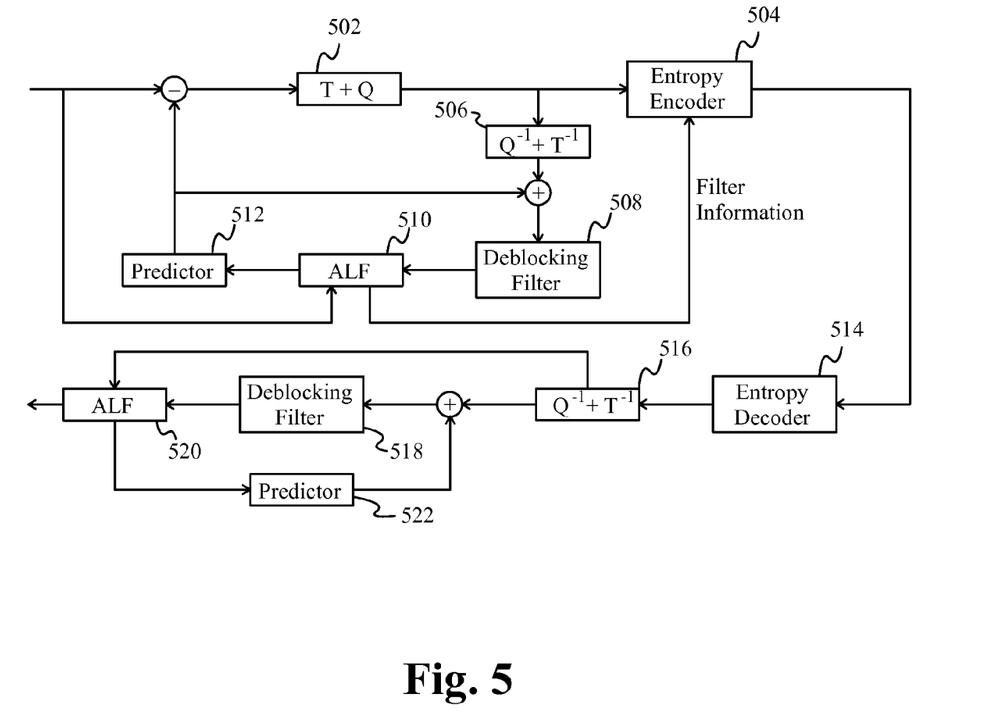
FIG. 5 illustrates a block diagram of a coder/decoder (codec) according to some embodiments.

FIG. 5 illustrates a block diagram of a coder/decoder (codec) according to some embodiments. An input video is received at the codec 500, and the video is split into a plurality of blocks. The codec 500 includes encoder components including: a Transform/Quantization module 502 where transform coefficients are scaled and quantized, an entropy encoder 504 such as a Context Adaptive Binary Arithmetic Coding (CABAC) performs entropy coding, an inverse Transform/Quantization module 506 applies an inverse transform/quantization, a deblocking filter 508 is implemented to control the strength of the filtering to reduce the block artifacts of the image, an adaptive loop filter 510 improves coding efficiency by applying filters to the deblocking-filtered image and a predictor 512 performs prediction steps. The codec 500 also includes decoder components including: an entropy decoder 514 for implementing entropy decoding, a second inverse Transform/Quantization module 516, a second deblocking filter 518, a second adaptive loop filter and a second predictor 522, which perform similar operations to those described above except in a decoding implementation. In the encoding aspect of the codec 500, any of the modified syntaxes is implemented, so that a decoder is able to utilize pipelining decoding. Fewer or additional components are able to be included as well.

Figure 6:
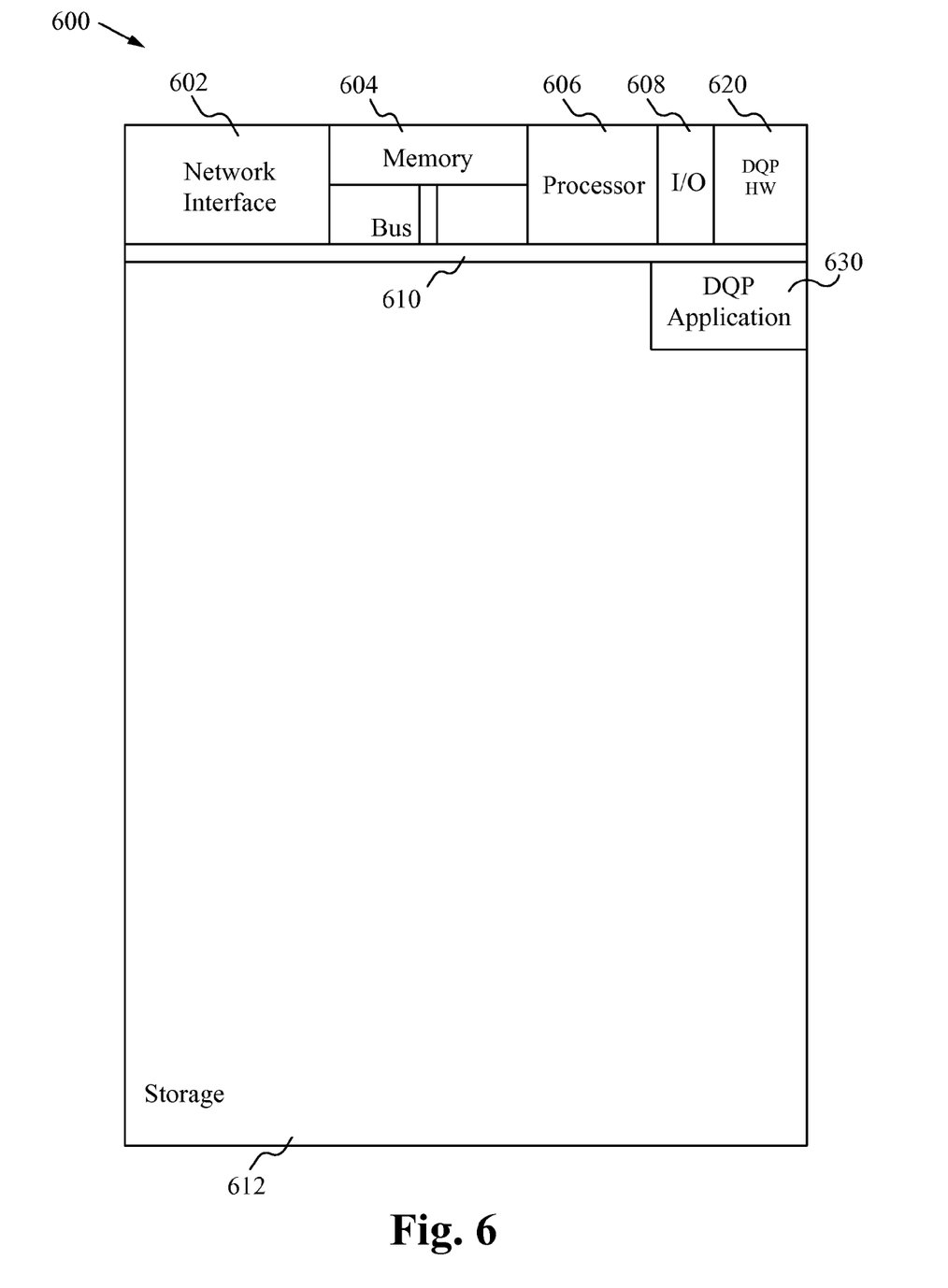
FIG. 6 illustrates a block diagram of an exemplary computing device configured to implement a modified DQP method according to some embodiments.

FIG. 6 illustrates a block diagram of an exemplary computing device 600 configured to implement the modified DQP method according to some embodiments. The computing device 600 is able to be used to acquire, store, compute, process, communicate and/or display information such as images, videos and audio. For example, a computing device 600 is able to acquire and store an image. The modified DQP method is able to be used during or after acquiring the image, or when displaying the image on the device 600. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, display, printer, modem, touchscreen, button interface and other devices. In some embodiments, the hardware structure includes multiple processors and other hardware to perform parallel processing. Modified DQP application(s) 630 used to implement the modified syntax are likely to be stored in the storage device 612 and memory 604 and processed as applications are typically processed. More or less components shown in FIG. 6 are able to be included in the computing device 600. In some embodiments, modified DQP hardware 620 is included. Although the computing device 600 in FIG. 6 includes applications 630 and hardware 620 for implementing the modified DQP method, the modified DQP method is able to be implemented on a computing device in hardware, firmware, software or any combination thereof. For example, in some embodiments, the modified DQP applications 630 are programmed in a memory and executed using a processor. In another example, in some embodiments, the modified DQP hardware 620 is programmed hardware logic including gates specifically designed to implement the method.

In some embodiments, the modified DQP application(s) 630 include several applications and/or modules. Modules include a determination module for determining where to place the DQP in the LCU such as after the mode information of the first coding unit, after the mode information of the first non-skipped coding unit or after the first non-zero coded block flag. In some embodiments, there are modules for determining whether the largest coding unit is coded in the SKIP mode, whether all of the coding units within the LCU are skipped and whether the coded block flags are zeros. In some embodiments, a decoding module is included which is able to implement pipelining because of the modified DQP placement. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

To utilize the modified DQP method, a user acquires a video/image such as on a digital camcorder, and while or after the video is acquired, or when displaying the video, the modified DQP method is utilized to encode the video so that the decoder is able to implement pipelining while decoding. The modified DQP method is able to be implemented automatically without user involvement.

In operation, the modified DQP method enables a decoder to use pipelining while decoding. Depending on the implementation, the DQP is able to be placed immediately after the mode information of the first coding unit, after the mode information of the first non-skipped coding unit or after the first non-zero coded block flag. The different implementations may result in improved efficiency.

Some Embodiments of Method for Delta-Qp Signaling for Decoder Parallelization in Hevc 1. A method programmed in a memory of a device comprising:
   a. determining if a largest coding unit is coded in SKIP mode;
   b. if the largest coding unit is coded in the SKIP mode, then no delta quantization parameter is sent; and
   c. if the largest coding unit is not coded in the SKIP mode, then signaling the delta quantization parameter immediately after mode information of a first coding unit.
2. The method of clause 1 further comprising decoding the largest coding unit using the delta quantization parameter.

3. The method of clause 2 wherein the decoding implements pipelining.
4. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
5. A method programmed in a memory of a device comprising:
  a. determining if all coding units within a largest coding unit are coded in SKIP mode;
  b. if all of the coding units within the largest coding unit are coded in the SKIP mode, then no delta quantization parameter is sent; and
  c. otherwise, signaling the delta quantization parameter immediately after mode information of a first non-skipped coding unit within the largest coding unit.
6. The method of clause 5 further comprising decoding the largest coding unit using the delta quantization parameter.
7. The method of clause 6 wherein the decoding implements pipelining.
8. The method of clause 5 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
9. A method programmed in a memory of a device comprising:
  a. determining if any transform unit within the largest coding unit has a non-zero coded block flag;
  b. if all of the transform units have zero coded block flags, then no delta quantization parameter is sent; and
  c. otherwise, signaling the delta quantization parameter immediately after a first non-zero coded block flag.
10. The method of clause 9 further comprising decoding the largest coding unit using the delta quantization parameter.
11. The method of clause 10 wherein the decoding implements pipelining.
12. The method of clause 9 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
13. An apparatus for integrating a delta quantization parameter into a bitstream of a largest coding unit comprising:
  a. a largest coding unit-skipped module for determining whether an entire largest coding unit is coded in a SKIP mode; and
  b. a determination module for determining whether to place a delta quantization parameter in the largest coding unit based on the largest coding unit-skipped module.
14. The apparatus of clause 13 wherein the determination module does not place the delta quantization parameter in the largest coding unit when the largest coding unit is coded in SKIP mode; otherwise, the determination module places the delta quantization parameter in the largest coding unit immediately after a first mode information.
15. The apparatus of clause 13 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
16. An apparatus for integrating a delta quantization parameter into a bitstream of a largest coding unit comprising:
  a. a coding unit-skipped module for determining whether all coding units within a largest coding unit are skipped; and
  b. a determination module for determining whether to place a delta quantization parameter in the largest coding unit based on the coding unit-skipped module.
17. The apparatus of clause 16 wherein the determination module does not place the delta quantization parameter in the largest coding unit when all of the coding units within the largest coding unit are skipped; otherwise, the determination module places the delta quantization parameter in the largest coding unit immediately after the mode information of a first non-skipped coding unit.
18. The apparatus of clause 16 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
19. An apparatus for integrating a delta quantization parameter into a bitstream of a largest coding unit comprising:
  a. a coded block flag module for determining whether all coded block flags within a largest coding unit are zeros; and
  b. a determination module for determining whether to place a delta quantization parameter in the largest coding unit based on the coded block flag module.
20. The apparatus of clause 19 wherein the determination module does not place the delta quantization parameter in the largest coding unit when all of the coded block flags within the largest coding unit are zeros; otherwise, the determination module places the delta quantization parameter in the largest coding unit immediately after a first non-zero coded block flag.
21. The apparatus of clause 19 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
22. An apparatus comprising:
  a. a memory for storing an application, the application for:
    i. determining if a largest coding unit is coded in SKIP mode;
    ii. if the largest coding unit is coded in the SKIP mode, then no delta quantization parameter is sent; and iii. if the largest coding unit is not coded in the SKIP mode, then signaling the delta quantization parameter immediately after the mode information of a first coding unit within the largest coding unit; and b. a processing component coupled to the memory, the processing component configured for processing the application.

23. The apparatus of clause 22 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

24. An apparatus comprising:
   a. a memory for storing an application, the application for:
      i. determining if all coding units within a largest coding unit are coded in SKIP mode;
      ii. if all of the coding units within the largest coding unit are coded in the SKIP mode, then no delta quantization parameter is sent; and
      iii. otherwise, signaling the delta quantization parameter immediately after mode information of a first non-skipped coding unit within the largest coding unit; and
   b. a processing component coupled to the memory, the processing component configured for processing the application.

25. The apparatus of clause 24 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

26. An apparatus comprising:
   a. a memory for storing an application, the application for:
      i. determining if any transform unit within the largest coding unit has a non-zero coded block flag;
      ii. if all of the transform units have zero coded block flags, then no delta quantization parameter is sent; and
      iii. otherwise, signaling the delta quantization parameter immediately after a first non-zero coded block flag; and
   b. a processing component coupled to the memory, the processing component configured for processing the application.

27. The apparatus of clause 26 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a memory of a device comprising:
   a. determining, with the device, if a largest coding unit is coded in SKIP mode;
   b. if the largest coding unit is coded in the SKIP mode, then no delta quantization parameter is sent; and
   c. if the largest coding unit is not coded in the SKIP mode, then signaling the delta quantization parameter immediately after mode information of a first coding unit.

2. The method of claim 1 further comprising decoding the largest coding unit using the delta quantization parameter.

3. The method of claim 2 wherein the decoding implements pipelining, wherein after decoding the first coding unit, the first coding unit is reconstructed immediately, while simultaneously decoding a second coding unit.

4. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

5. A method programmed in a memory of a device comprising:
   a. determining, with the device, if all coding units within a largest coding unit are coded in SKIP mode;
   b. if all of the coding units within the largest coding unit are coded in the SKIP mode, then no delta quantization parameter is sent; and
   c. otherwise, signaling the delta quantization parameter immediately after mode information of a first non-skipped coding unit within the largest coding unit.

6. The method of claim 5 further comprising decoding the largest coding unit using the delta quantization parameter.

7. The method of claim 6 wherein the decoding implements pipelining, wherein after decoding a first coding unit, the first coding unit is reconstructed immediately, while simultaneously decoding a second coding unit.

8. The method of claim 5 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

9. A method programmed in a memory of a device comprising:
   a. determining, with the device, if any transform unit within the largest coding unit has a non-zero coded block flag;
   b. if all of the transform units have zero coded block flags, then no delta quantization parameter is sent; and
   c. otherwise, signaling the delta quantization parameter immediately after a first non-zero coded block flag.

10. The method of claim 9 further comprising decoding the largest coding unit using the delta quantization parameter.

11. The method of claim 10 wherein the decoding implements pipelining, wherein after decoding a first coding unit, the first coding unit is reconstructed immediately, while simultaneously decoding a second coding unit.

12. The method of claim 9 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

13. An apparatus for integrating a delta quantization parameter into a bitstream of a largest coding unit comprising:
   a. a largest coding unit-skipped module for determining whether an entire largest coding unit is coded in a SKIP mode; and
   b. a determination module for determining whether to place a delta quantization parameter in the largest coding unit based on the largest coding unit-skipped module, wherein the determination module does not place the delta quantization parameter in the largest coding unit when the largest coding unit is coded in SKIP mode; otherwise, the determination module places the delta quantization parameter in the largest coding unit immediately after a first mode information.

14. The apparatus of claim 13 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

15. An apparatus for integrating a delta quantization parameter into a bitstream of a largest coding unit comprising:
   a. a coding unit-skipped module for determining whether all coding units within a largest coding unit are skipped; and
   b. a determination module for determining whether to place a delta quantization parameter in the largest coding unit based on the coding unit-skipped module, wherein the determination module does not place the delta quantization parameter in the largest coding unit when all of the coding units within the largest coding unit are skipped; otherwise, the determination module places the delta quantization parameter in the largest coding unit immediately after the mode information of a first non-skipped coding unit.

16. The apparatus of claim 15 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

17. An apparatus for integrating a delta quantization parameter into a bitstream of a largest coding unit comprising:
   a. a coded block flag module for determining whether all coded block flags within a largest coding unit are zeros; and
   b. a determination module for determining whether to place a delta quantization parameter in the largest coding unit based on the coded block flag module, wherein the determination module does not place the delta quantization parameter in the largest coding unit when all of the coded block flags within the largest coding unit are zeros; otherwise, the determination module places the delta quantization parameter in the largest coding unit immediately after a first non-zero coded block flag.

18. The apparatus of claim 17 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

19. An apparatus comprising:
   a. a memory for storing an application, the application for:
      i. determining if a largest coding unit is coded in SKIP mode;
      ii. if the largest coding unit is coded in the SKIP mode, then no delta quantization parameter is sent; and
      iii. if the largest coding unit is not coded in the SKIP mode, then signaling the delta quantization parameter immediately after the mode information of a first coding unit within the largest coding unit; and
   b. a processing component coupled to the memory, the processing component configured for processing the application.

20. The apparatus of claim 19 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

21. An apparatus comprising:
   a. a memory for storing an application, the application for:
      i. determining if all coding units within a largest coding unit are coded in SKIP mode;
      ii. if all of the coding units within the largest coding unit are coded in the SKIP mode, then no delta quantization parameter is sent; and
      iii. otherwise, signaling the delta quantization parameter immediately after mode information of a first non-skipped coding unit within the largest coding unit; and
   b. a processing component coupled to the memory, the processing component configured for processing the application.

22. The apparatus of claim 21 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

23. An apparatus comprising:
a. a memory for storing an application, the application for:
   i. determining if any transform unit within the largest coding unit has a non-zero coded block flag;
   ii. if all of the transform units have zero coded block flags, then no delta quantization parameter is sent; and
   iii. otherwise, signaling the delta quantization parameter immediately after a first non-zero coded block flag; and
b. a processing component coupled to the memory, the processing component configured for processing the application.

24. The apparatus of claim 23 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music device, a smart phone, a tablet computer, a video player, a DVD writer/player, a high definition video writer/player, a television and a home entertainment system.

* * * * *